United States Patent
Hardwick et al.

(10) Patent No.: US 10,003,290 B2
(45) Date of Patent: Jun. 19, 2018

(54) METHOD OF MONITORING POWER PROVISION OF A GENERATOR SET

(71) Applicant: J. C. Bamford Excavators Limited, Uttoxeter (GB)

(72) Inventors: David Hardwick, Uttoxeter (GB); Jonathan Garnham, Uttoxeter (GB)

(73) Assignee: J. C. Bamford Excavators Limited, Uttoxeter, Staffordshire (GB)

(*) Notice: Subject to any disclaimer, the term of this patent is extended or adjusted under 35 U.S.C. 154(b) by 325 days.

(21) Appl. No.: 14/791,222

(22) Filed: Jul. 2, 2015

(65) Prior Publication Data
US 2016/0006384 A1    Jan. 7, 2016

(30) Foreign Application Priority Data

| Jul. 2, 2014 | (GB) | 1411845.9 |
| Jul. 2, 2014 | (GB) | 1411846.7 |
| Jul. 2, 2014 | (GB) | 1411847.5 |

(51) Int. Cl.
*G05D 3/12*   (2006.01)
*H02P 9/08*   (2006.01)
(Continued)

(52) U.S. Cl.
CPC .......... *H02P 9/08* (2013.01); *G05B 15/02* (2013.01); *H02J 7/1438* (2013.01); *H02P 9/00* (2013.01)

(58) Field of Classification Search
CPC .......... G05B 15/02; H02J 7/1438; H02P 9/00
(Continued)

(56) References Cited

U.S. PATENT DOCUMENTS

| 6,351,692 B1 * | 2/2002 | Eaton ............... G05B 19/042 322/10 |
| 2004/0010349 A1 | 1/2004 | Perez et al. |

(Continued)

FOREIGN PATENT DOCUMENTS

| CN | 201794665 U | 4/2011 |
| CN | 102494719 A | 6/2012 |

(Continued)

OTHER PUBLICATIONS

Extended European Search Report for EP 15 17 5159, dated Nov. 19, 2015.
Search Report for GB 1411847.5, dated Dec. 24, 2014.

*Primary Examiner* — Robert Cassity
(74) *Attorney, Agent, or Firm* — Marshall, Gerstein & Borun LLP

(57) ABSTRACT

The present invention provides a method of remotely monitoring the power provision of a generator set at a location comprising determining an expected electrical energy usage at a first location, providing a generator set configured to provide electrical energy to power or devices at the location, the generator set arranged to provide an amount of electrical energy to meet the determined expected electrical energy usage, and the generator having a telemetry module to monitor and transmit electrical energy supply data to a second location, the telemetry module monitoring the supply data over a predetermined period and transmitting the supply data to the processor, analyzing the supply data to determine a power supply profile at the first location, and comparing the power supply profile with the expected power usage and/or the power supply specifications of the generator set.

13 Claims, 10 Drawing Sheets

(51) Int. Cl.
  *H02J 7/14*    (2006.01)
  *G05B 15/02*   (2006.01)
  *H02P 9/00*    (2006.01)

(58) Field of Classification Search
  USPC .......................................................... 700/287
  See application file for complete search history.

(56) References Cited

U.S. PATENT DOCUMENTS

| | | |
|---|---|---|
| 2012/0056436 A1 | 3/2012 | Russell et al. |
| 2012/0191262 A1* | 7/2012 | Marcus .............. G06Q 30/0202 |
| | | 700/286 |
| 2014/0309797 A1* | 10/2014 | Frampton ................. H02P 9/02 |
| | | 700/287 |
| 2015/0005975 A1* | 1/2015 | Di Cristofaro ........ G05B 15/02 |
| | | 700/297 |
| 2016/0111879 A1* | 4/2016 | Ayana ................... H02J 3/1885 |
| | | 307/66 |

FOREIGN PATENT DOCUMENTS

| | | |
|---|---|---|
| CN | 203799239 U | 8/2014 |
| DE | 29610560 U1 | 8/1996 |
| GB | 2 491 349 A | 12/2012 |
| WO | WO-2012/077820 A1 | 6/2012 |

\* cited by examiner

METHOD OF MONITORING POWER PROVISION OF A GENERATOR SET

FIELD OF THE INVENTION

The present invention relates to a method of monitoring power provision of a generator set, in particular a method of remotely monitoring power provision of a generator set at a location.

The present invention also relates to a method reducing power wastage on a construction site, and a system for facilitating such reduction.

BACKGROUND OF THE INVENTION

Construction sites, especially during the foundation preparation stage, are generally without access to mains electricity (i.e. are "off-grid" locations). As a result, power systems such as generator sets (often referred to as "gensets"), are utilised on construction sites to provide power to one or more devices/equipment on the construction site, for example a tower crane, flood lights, site cabin power sockets etc. Gensets are also used in other analogous situations for oil and gas exploration, mining, disaster recovery and the like.

The generator set typically includes a diesel/petrol engine arranged to drive an alternator or other form of generator in order to convert the mechanical output from the diesel/petrol engine into electrical energy.

The generator sets may vary in electrical power output from approx. 5 kVA up to around 1000 kVA, but continue to be portable, e.g. by providing wheels so as to be towable or lifting points for pallet forks or chains.

Different sites have different demands for electricity. Some may have a relatively constant demand throughout a day and/or from day-to-day, whereas other sites may have demands that are variable.

The size of generator set required is generally determined at the start of the construction or other project and used throughout the project. However, the maximum power demand on site may change during different phases of the construction project even if the day-to-day demand during the each of the phases of construction remains constant.

The variation in power demand over the duration of the construction project, generally means that the operational efficiency of diesel/petrol powered generator sets are less than optimal. This results in excess usage of fuel and more frequent maintenance requirements.

It is desirable to provide a method of monitoring power provision of a generator set at a location, such as on a construction site, which addresses one or more of the problems and disadvantages identified above.

SUMMARY OF THE INVENTION

A first aspect of the invention provides a method of remotely monitoring the power provision of a generator set at a location comprising the steps of:
  determining an expected electrical energy usage by one or more devices at a first location;
  providing a generator set configured to provide electrical energy to power the one or more devices at the location, the generator set arranged to provide an amount of electrical energy that at least meet the determined expected electrical energy usage, and the generator having a telemetry module arranged to monitor electrical energy supply data and transmit the electrical energy supply data to a processor at a second different location;
  the telemetry module monitoring the electrical energy supply data of the generator set over a predetermined period and transmitting the electrical energy supply data to the processor;
  the processor analysing the electrical energy supply data to determine a power supply profile for the generator set at the first location; and
  comparing the power supply profile for the generator set with the expected power usage and/or the power supply specifications of the generator set.

By means of the present invention, the power provision of a generator set at a location can be monitored from a second remote location. In addition, by comparing the power supply profile for the generator set with the expected power usage and/or the power supply specifications of the generator set means that the power usage at the location can be monitored to ensure that optimal use of the generator set is obtained.

In addition, the monitoring and comparison facilitates the calculation of the expected electrical energy usage at different sites and for future projects as it helps fine tune the determination process.

The power supply profile may comprise a maximum power supply value for the first location location.

The power supply profile may comprise an average power supply value for the first location.

The power supply profile may comprise a minimum power supply value for the first location.

A second aspect of the invention provides a method of reducing power wastage of a generator set at a location comprising the steps of:
  monitoring the power provision of the generator set at a first location using a method in accordance with the first aspect to determine a power supply profile for the first location;
  the processor comparing the power supply profile against the power supply specifications of available generator sets in a database thereof; and
  if a second generator set having a power supply specification more closely matching the power supply profile is available, replacing the generator set with the second generator set.

In exemplary embodiments, the second generator set comprises an engine-generator.

In exemplary embodiments, the second generator set comprises a hybrid power system comprising an engine-generator, a battery pack and a power management centre.

The method in accordance with the second aspect may further comprise the steps of:
  monitoring the power provision of the second generator set to the one or more devices at the first location;
  determining a power supply profile for the second generator set;
  the computer comparing the power supply profile of the second generator set against the power supply specifications of available generator sets in a database thereof; and
  if a third generator set having a power supply specification more closely matching the power supply profile of the second generator set is available, replacing the second generator set with the third generator set.

A third aspect of the invention provides a method of reducing power wastage of a generator set at a location comprising the steps of:

monitoring the power provision of the generator set at a first location using a method in which the generator set is arranged to provide an amount of electrical energy that at least meets a determined expected electrical energy usage, and the generator having a telemetry module arranged to monitor electrical energy supply data and transmit the electrical energy supply data to a processor at a second different location;

the telemetry module monitoring the electrical energy supply data of the generator set over a predetermined period and transmitting the electrical energy supply data to the processor;

the processor analysing the electrical energy supply data to determine a power supply profile for the generator set at the first location;

the processor comparing the power supply profile for the generator set with the expected power usage and/or the power supply specifications of the generator set to determine a power supply profile;

the processor comparing the power supply profile against the power supply specifications of the generator set and identifying the difference between the two;

the processor comparing the difference against available battery packs or battery boxes in a database thereof;

if a battery pack or battery box having a power supply specification more closely matching the difference is available, undertaking a selected one of supplementing the generator set with the matching battery pack or battery box and replacing an existing battery pack or battery box with the matching battery pack or battery box.

The methods in accordance with the second and third aspect facilitate the optimisation of a generator set at a location by continuously monitoring the power provision and replacing or supplementing the generator set at the location with a power system which brings the power provision at the location in better match with the actual power usage at the location.

A fourth aspect of the invention provides system for monitoring power consumption provisions of a generator set at a location comprising:

a plurality of generator sets, each generator having a telemetry module arranged to monitor electrical energy supply data and transmit the electrical energy supply data to a processor at a second different location in use of the generator set;

a database comprising the power supply specifications of each of the plurality of generator sets; and a processor configured to receive the electrical energy supply data transmitted by the telemetry, wherein the processor is configured to create a power supply profile for a generator set in use and compare the power supply profile with the power supply specifications contained in the database.

In exemplary embodiments, the system further comprises one or more battery packs or boxes, each battery pack or box configured to be coupled to a generator set.

A fifth aspect of the invention provides a generator set for supplying power to an outlet for electrical energy, the generator set comprising a first portion and a second portion, the first portion comprising a prime mover and a generator, wherein the generator is driven by the prime mover, the second portion comprising a battery pack, wherein the battery pack is connected to the generator to receive power from the generator to charge the battery pack, and wherein the second portion is located substantially underneath the first portion.

Providing a generator set comprising a first portion including the prime mover and generator and a second portion including a battery pack is advantageous as it allows for the easy removal/exchange of the portion containing the battery pack. This would advantageously allow for the exchange of a fully battery pack for an empty one. This arrangement would also advantageously allow for the generator set to be switched between having a battery pack and not having a battery pack when one was not required. Furthermore, providing the battery pack substantially underneath the first portion advantageously improves the weight distribution of the generator set.

In one embodiment, the second portion comprises a second portion housing to enclose the battery pack, the second portion housing having at least one inlet and at least one outlet to allow air to flow therethrough.

Providing the second portion housing with at least one air inlet and outlet enables air to flow over the batteries independent of any heat generated in the first portion. This air flow reduces the risk of the battery pack overheating.

In one embodiment, the second portion further comprises a fan to increase the rate of air flow and therefore cooling.

In one embodiment, one of the inlet and outlet are located on an end face and the other of the inlet and outlet are located on a side face of the battery housing.

Providing the inlet and outlet in this configuration ensures that the air flow passes over the battery pack, thus keeping the battery pack cool. In one embodiment the battery pack is split into two sections with a divider therebetween, and each section has a separate inlet and outlet in this arrangement.

In one embodiment, the second portion housing comprises an opening in an upper surface thereof to allow cabling to pass therethrough.

In one embodiment, the first portion further comprises a bund located at a bottom thereof, the bund comprising a duct located substantially over the opening to enable the electrical cables to pass therethrough and the bund to remain liquid tight.

Providing the bund with a passage through it which is impervious to liquid advantageously enables an easy pathway for the electrical cables to pass in order to connect the first portion to the second portion.

In one embodiment, the first portion comprises a first portion housing to enclose the prime mover and the generator, the first portion housing comprising a first portion inlet and a first portion outlet defining an air flow path to allow air to pass therethrough past the generator and prime mover.

Providing the first portion with an inlet and an outlet is advantageous as this will enable air to flow over the generator and prime mover and so reducing the risk of overheating.

In one embodiment, the first portion housing comprises a fan to provide forced air flow on the air flow path, so as to increase the rate of cooling.

In one embodiment, the first portion comprises a charger to convert AC power from the generator to DC power to charge the battery pack.

In one embodiment, the charger is located in the air flow path.

Locating the charger in the air flow path advantageously allows air to flow over the charger to prevent, reducing the risk of overheating.

In one embodiment, the charger is located upstream of the prime mover in the air flow path.

Locating charger upstream of the prime mover is advantageous as it allows air to flow over the charger before it has been heated by the prime mover, thus providing better cooling of the charger.

In one embodiment, the generator produces three phase AC power.

Three phase AC power allows for quicker charging of the batteries and enables large plant and equipment to be efficiently powered.

In one embodiment, the first portion housing further comprises three chargers to convert the three phase AC power from the generator into DC power so as to charge the battery.

In one embodiment, the generator is an alternator.

In one embodiment, the generator set comprises a power outlet powered directly from the generator.

In one embodiment, the generator set comprises a power outlet powered from the battery pack In one embodiment, the generator set comprises a connection for mounting an external battery pack thereto.

In one embodiment, the prime mover is a diesel engine.

In one embodiment, the prime mover and generator are capable of producing a greater amount of electricity than can be supplied to the battery pack for charging.

In one embodiment, the first portion is releasably securable to the second portion.

A sixth aspect of the present invention provides a generator set for supplying power to an outlet for electrical energy, the generator set comprising a first portion and a second portion, the first portion comprising a prime mover and a generator, wherein the generator is driven by the prime mover, the second portion comprising a battery pack, wherein the battery pack is connected to the generator to receive power from the generator to charge the battery pack, wherein the first portion comprises a first portion housing to enclose the prime mover and the generator, the first housing comprising a first portion inlet and a first portion outlet defining an air flow path to allow air to pass therethrough past the generator and prime mover, and the first portion comprises a charger to convert AC power from the generator to DC power to charge the battery pack, and the charger is located in the air flow path.

A seventh aspect of the invention provides a generator set comprising a battery pack for the storage of electrical energy; a first outlet for electrical energy; a second outlet for electrical energy to be supplied with electrical energy from the battery pack; an electrical generator configured to selectively supply electrical energy to the battery pack and to the first outlet; a prime mover arranged to drive the electrical generator; and a control system; wherein the control system is configured to signal operation of the prime mover to seek to maintain state of charge of the battery pack within a desired range, but to provide at least some of the electrical energy supply to the first outlet in response to a demand from a device attached to the first outlet.

Providing a generator set with a battery pack and maintaining its state of charge within a desired range is advantageous as it enables the prime mover to run intermittently when there is a relatively low demand for power to periodically "top-up" the charge. In turn this may reduce fuel consumption, emissions, and the need to service the prime mover. Maintaining the battery charge within a desired range provides a buffer of reserve power in the battery pack, should there be problems with the operation of the prime mover, and may extend the overall service life of the battery pack. Further this approach ensures that the prime mover is sufficiently loaded when running to avoid problems with engine coking (if the prime mover is an IC engine) and ensure it is operational at an efficient part of its power band. Providing a control system to provide energy to an outlet in response to a demand nevertheless ensures that if there is a power demand that cannot be met by the battery pack, power can be diverted from the battery charging to meet the demand.

In one embodiment, the maximum power output from the prime mover and generator are at least 1.2 times greater than the maximum power at which the battery pack may be recharged, preferably 1.5 times greater, even more preferably 2 times greater.

This arrangement is advantageous as the generator provides more power than can be utilised by the battery pack, ensuring that in typical operation, the generator is able to provide power to the first outlet whilst charging the battery pack.

An eighth aspect of the present invention provides a generator set comprising a battery pack for the storage of electrical energy; a first outlet for electrical energy; a second outlet for electrical energy to be supplied with electrical energy from the battery pack; an electrical generator configured to selectively supply electrical energy to the battery pack and to the first outlet; and a prime mover arranged to drive the electrical generator; wherein the power output of the prime mover and generator is at least 1.2 times greater than the power at which the battery pack may be charged.

Optional features of the first and second aspects of the present invention are as follows:

In one embodiment, the generator is configured to provide all electrical energy being generated to the first outlet if a predetermined criterion is met. Preferably, the predetermined criterion is a predetermined load on the generator.

This arrangement is advantageous as it prevents charging the battery pack in response to a high power demand on the first outlet to ensure that the high power demand can be met.

In one embodiment, the desired range has a lower charge limit greater than 0%.

This arrangement prevents the battery packs from completely emptying which is advantageous as it may extend the service life of the battery pack which results in lower maintenance costs.

In one embodiment, the desired range has an upper limit less than 100%.

This arrangement is advantageous as it increases the overall efficiency of the generator set as when a battery charge has reached a predetermined level, for example 80% for lead acid batteries, it becomes much less efficient to continue charging the battery pack.

In one embodiment, the generator set comprises a mode of operation wherein a load demand sensed on the first outlet causes the prime mover to operate.

This arrangement is advantageous as it allows the generator to start running in response to a demand on the first outlet, rather than running all the time. As such, this increases the overall efficiency of the generator set.

In one embodiment, the generator set comprises a mode of operation where an energy demand up to a predetermined level on the second outlet is provided from the battery pack and above the predetermined level of the demand is supplied at least in part by the generator via the battery pack.

This arrangement is advantageous as it allows for lower amounts of power to be supplied from the battery packs without the requirement of the engine running, but enables higher demands from the second outlet to be met from the generator, thus increasing the overall efficiency of the generator set, whilst avoiding the need to provide a larger battery pack.

Preferably the demand is supplied entirely by the generator.

This arrangement is advantageous as it allows for a high supply of power to the second outlet directly from the engine thus preventing the battery packs from depleting below a predetermined level which extends the service life of the battery pack, or being exhausted.

In one embodiment, the generator set comprises a mode of operation configured such that when the load stops on the first outlet and the battery pack is within a desired range and demand on the second outlet is below a predetermined threshold, the generator is caused to stop.

This mode ensures that the prime mover does not run unnecessarily, saving fuel.

In one embodiment, the generator set comprises a charger to convert AC electricity from the generator to DC electricity for charging the battery pack.

In one embodiment, the generator is a three phase generator and the generator set comprises a charger for each phase thereof.

This is advantageous as a three phase power system is more economical that a single phase system for distributing power.

In one embodiment, the generator set comprises an inverter to convert the DC electricity from the battery pack to AC electricity for supply to the second outlet. Preferably, one charger and the inverter are provided as a single unit.

In one embodiment, the first outlet is a three phase outlet.

In one embodiment, the second outlet is a single phase outlet.

In one embodiment, the generator is alternator.

In one embodiment, the prime mover is an internal combustion engine.

In one embodiment, the battery pack and the prime mover are housed in a single unit.

In one embodiment, a portion of the unit housing the battery pack is separable from a portion housing the prime mover.

This allows for the easy removal and possible exchange or maintenance of the battery pack from the main unit.

In one embodiment, the battery pack is housed in a separate unit from the prime mover.

This allows for the easy removal and possible exchange or maintenance of the battery pack from the main unit.

In one embodiment, the unit housing the battery pack further houses a charger and an inverter.

This arrangement is advantageous as the generator provides more power than can be utilised by the battery pack, ensuring that the generator is able to provide power to the first outlet for high power demand devices, whilst normally being able to charge the battery pack, to provide a separate supply of power to lower demand devices.

A ninth aspect of the present invention provides a control system configured to control a generator set of a type having a battery pack for the storage of electrical energy; a first outlet for electrical energy; a second outlet for electrical energy to be supplied with electrical energy from the battery pack; an electrical generator configured to selectively supply electrical energy to the battery pack and to the first outlet; and a prime mover arranged to drive the electrical generator; wherein the control system is configured to signal operation of the prime mover to seek to maintain a state of charge of the battery pack within a desired range, but to further control the charging of the battery pack so as to provide at least some of the electrical energy supply to the first outlet in response to a demand from a device attached to the first outlet.

Providing a control system control a generator set with a battery pack and maintaining its state of charge within a desired range is advantageous as it enables the prime mover to run intermittently when there is a relatively low demand for power to periodically "top-up" the charge. In turn this may reduce fuel consumption, emissions, and the need to service the prime mover. Maintaining the battery charge within a desired range provides a buffer of reserve power in the battery pack, should there be problems with the operation of the prime mover, and may extend the overall service life of the battery pack. Further this approach ensures that the prime mover is sufficiently loaded when running to avoid problems with engine coking (if the prime mover is an IC engine) and ensure it is operation at an efficient part of its power band. Providing a control system to provide energy to an outlet in response to a demand nevertheless ensures that if there is a power demand that cannot be met by the battery, power can be diverted from the battery charging to meet the demand.

In one embodiment, the control system is configured to signal the provision of all electrical energy being generated to the first outlet if a predetermined criterion is met.

In one embodiment, the predetermined criterion is a predetermined load on the generator.

This arrangement is advantageous as it prevents charging the battery pack in response to a high power demand on the first outlet to ensure that the high power demand can be met.

In one embodiment, the desired range has a lower charge limit greater than 0%.

This arrangement prevents the battery packs from completely emptying which is advantageous as may extend the service life of the battery pack which results in lower maintenance costs.

In one embodiment, the desired range has an upper limit less than 100%.

This arrangement is advantageous as it increases the overall efficiency of the generator set as when a battery charge has reached a predetermined level, for example 80% for lead acid batteries, it becomes much less efficient to continue charging the battery pack.

In one embodiment, the control system comprises a mode of operation wherein a load demand sensed on the first outlet causes the prime mover to operate.

This arrangement is advantageous as it allows the generator to start running in response to a demand on the first outlet, rather than running all the time. As such, this increases the overall efficiency of the generator set.

In one embodiment, the control system comprises a mode of operation where an energy demand up to a predetermined level on the second outlet is provided from the battery pack and above the predetermined level of the demand is supplied at least in part by the generator via the battery pack.

This arrangement is advantageous as it allows for lower amounts of power to be supplied from the battery packs without the requirement of the engine running, but enables higher demands from the second outlet to be met from the generator, thus increasing the overall efficiency of the generator set, whilst avoiding the need to provide a larger battery pack.

In one embodiment, the demand is supplied entirely by the generator.

This arrangement is advantageous as it allows for a high supply of power to the second outlet directly from the engine and thus preventing the battery packs from depleting below a predetermined level which extends the service life of the battery pack, or being exhausted.

In one embodiment, the control system comprises a mode of operation configured such that when the load stops on the first outlet and the battery pack is within a desired range and demand on the second outlet is below a predetermined threshold, the generator is caused to stop.

This mode ensures that the prime mover does not run unnecessarily, saving fuel.

In one embodiment, the control functions are distributed between at least a main control module and a charger inverter.

Advantageously, this enables the additional functionality of the present invention to be provided by with the minimum amount of customisation.

A tenth aspect of the present invention provides a method of operating a mobile generator set according to any preceding claim, the method comprising the steps of: operating the generator set to maintain a state of charge of the battery pack within a desired range by selectively running the prime mover to charge the battery pack if it becomes depleted; ceasing or reducing charging of the battery pack in the event that a demand from a device attached to the first outlet exceeds a predetermined threshold.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
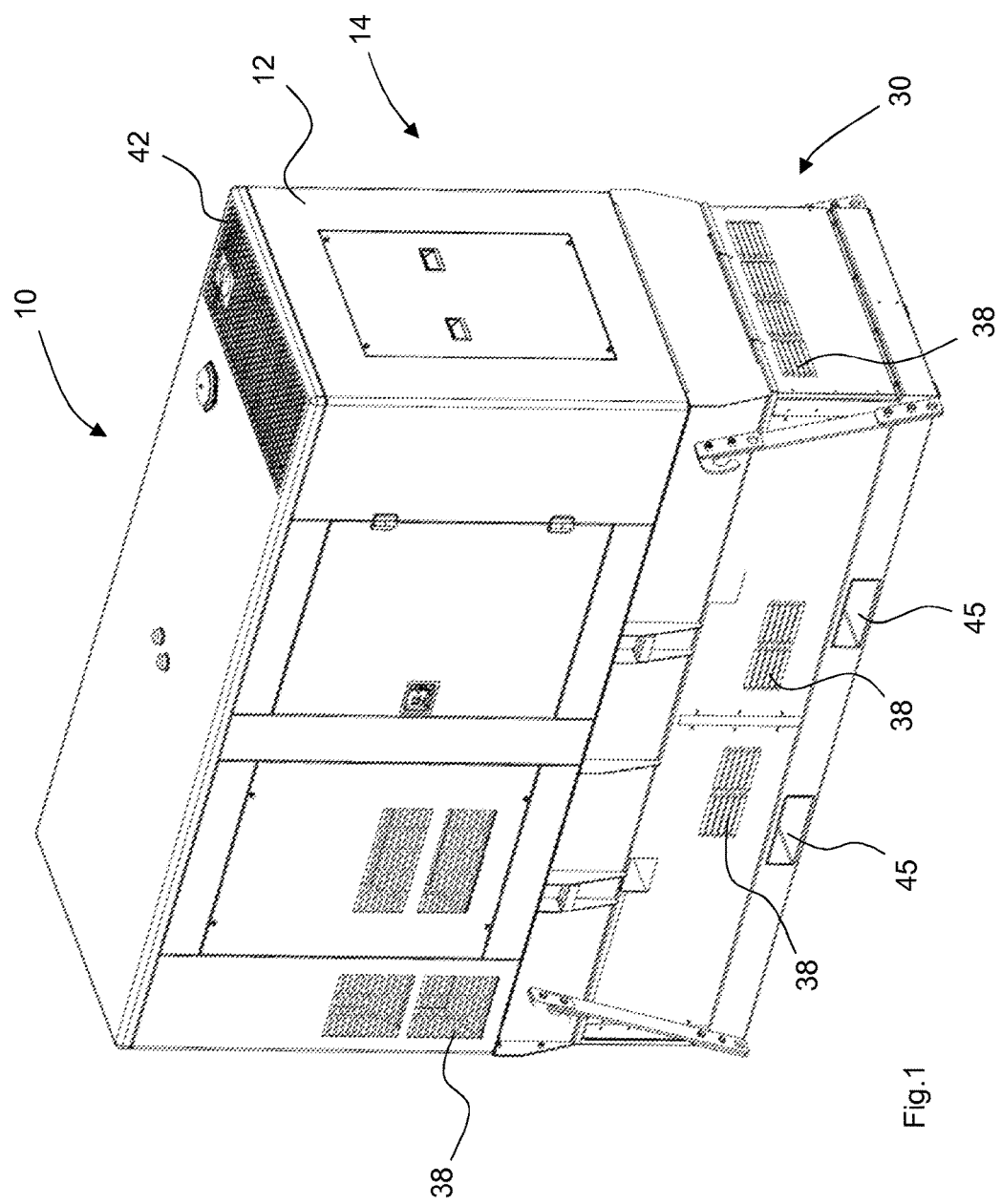
FIGS. 1 and 2 are isometric and side views of an embodiment of a generator set for use with the invention.

The preceding discussion of the background to the invention is intended only to facilitate an understanding of the present invention. It should be appreciated that the discussion is not an acknowledgement or admission that any of the material referred to was part of the common general knowledge as at the priority date of the application.

Throughout the description and claims of this specification, the words "comprise" and "contain" and variations of the words, for example "comprising" and "comprises", mean "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics, and compounds described in conjunction with a particular aspect, embodiment or example of the invention are to be understood to be applicable to any other aspect, embodiment or example described herein unless incompatible therewith.

With reference to FIGS. 1 to 6, a first embodiment of a generator set 10 (hereinafter "genset") for use with a method in accordance with the invention is shown. The genset 10 is in the form of a hybrid power system and comprises a canopy 12 having a largely conventional upper portion 14 including a prime mover (a diesel internal combustion engine 15 in this embodiment) mounted fore-aft and having an output drive coupled to a generator in the form of a three phase alternator 16. The upper portion further includes a fuel tank 18, a cooling system comprising a fan 19 driven by the engine, and at the bottom of thereof, a bund 28 is provided so as to capture any fluid leaks.

The upper portion also includes part of a control system 20, including a control panel with control inputs 22 and a display 24. Additionally, in this embodiment, the upper portion 14 includes an AC/DC converter in the form of three chargers 26a, 26b, 26c. The bund 28 has a passage through it with a liquid impervious side wall around it to route cables (not shown) down to a lower portion 30 beneath the bund, but without compromising its capacity to capture fluid.

Figure 3:
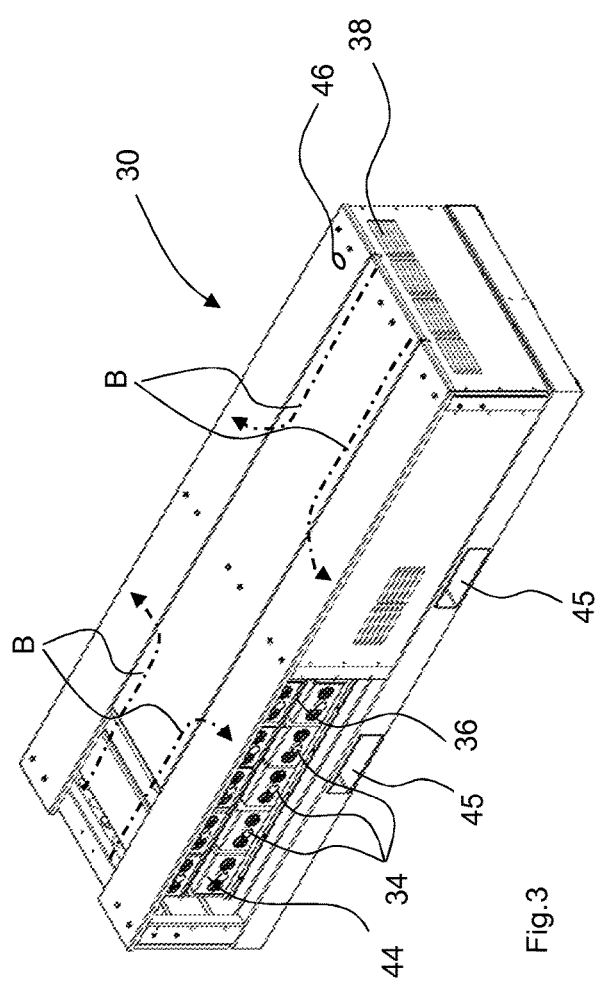
FIGS. 3 and 4 are isometric and side views of a lower portion of the generator set of FIGS. 1 and 2.
Figure 4:
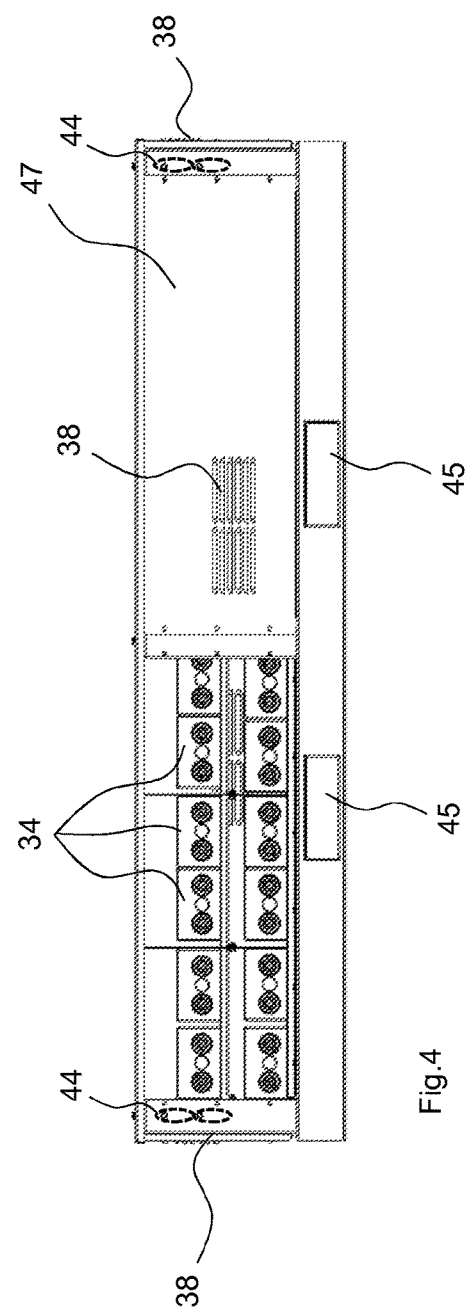

The canopy further comprises the lower portion 30 shown in more detail in FIGS. 3 and 4. The lower portion 30 has substantially the same footprint as the upper section 14 and principally houses a battery pack 32. In this embodiment the battery pack comprises 24 2V lead acid batteries 34 (12 visible in FIG. 4) with a gel electrolyte to prevent leakage, and arranged on racks 36 in two layers. Individual batteries 34 may be slid from the rack for inspection or replacement. In other embodiments different battery types may be used, such as Nickel Cadmium or Lithium Ion and the capacity and number may be adjusted as required.

Figure 2:
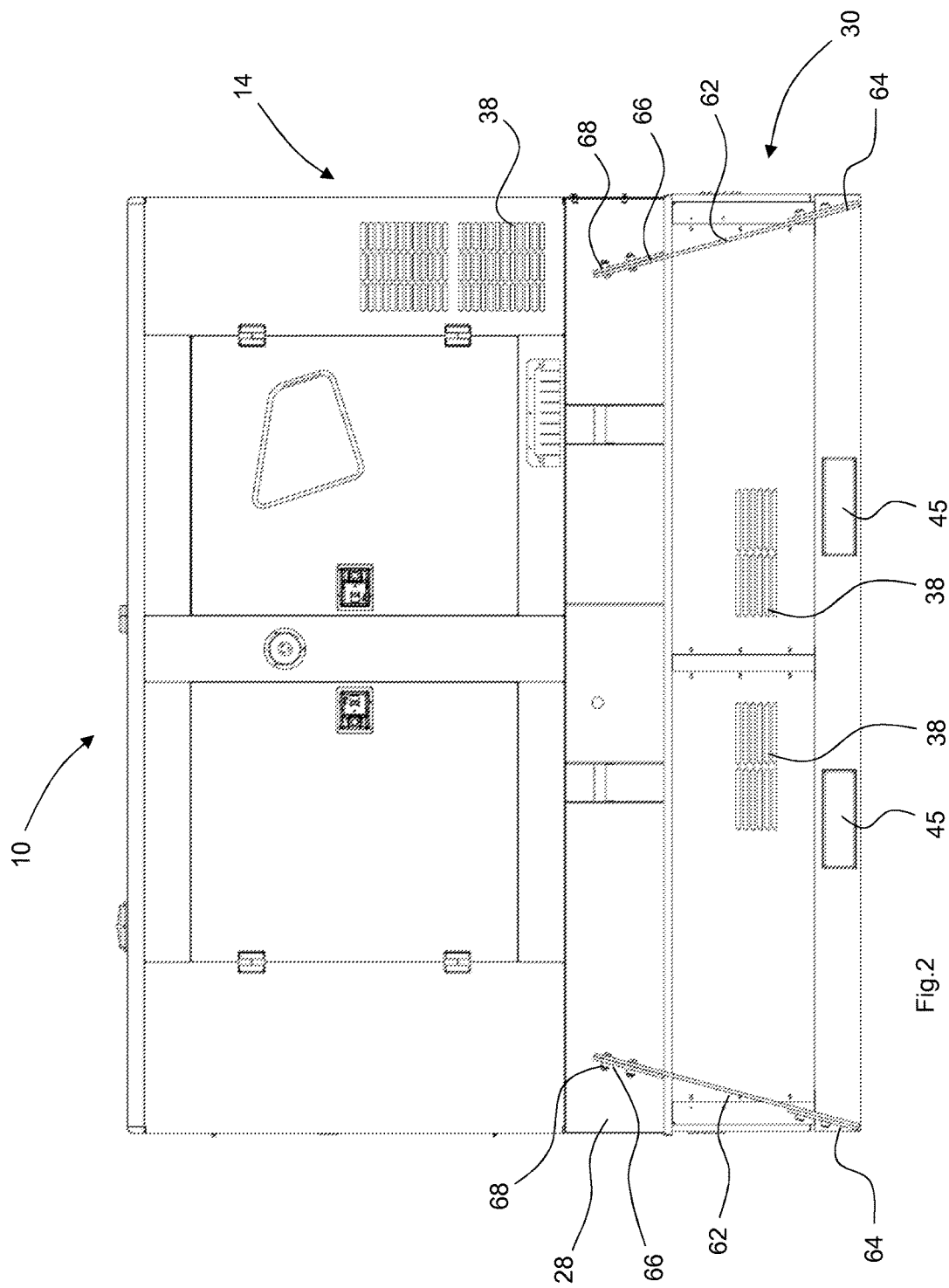

Considering the upper portion 14 in more detail in relation to FIGS. 1 and 2 it can be seen that the canopy is formed from sheet metal in a conventional manner, with various access doors provided therein in order to access the control inputs 22 and display 24, and for maintenance purposes. In addition, grilles and louvers are provided to allow air to flow through the canopy.

Figure 2A:
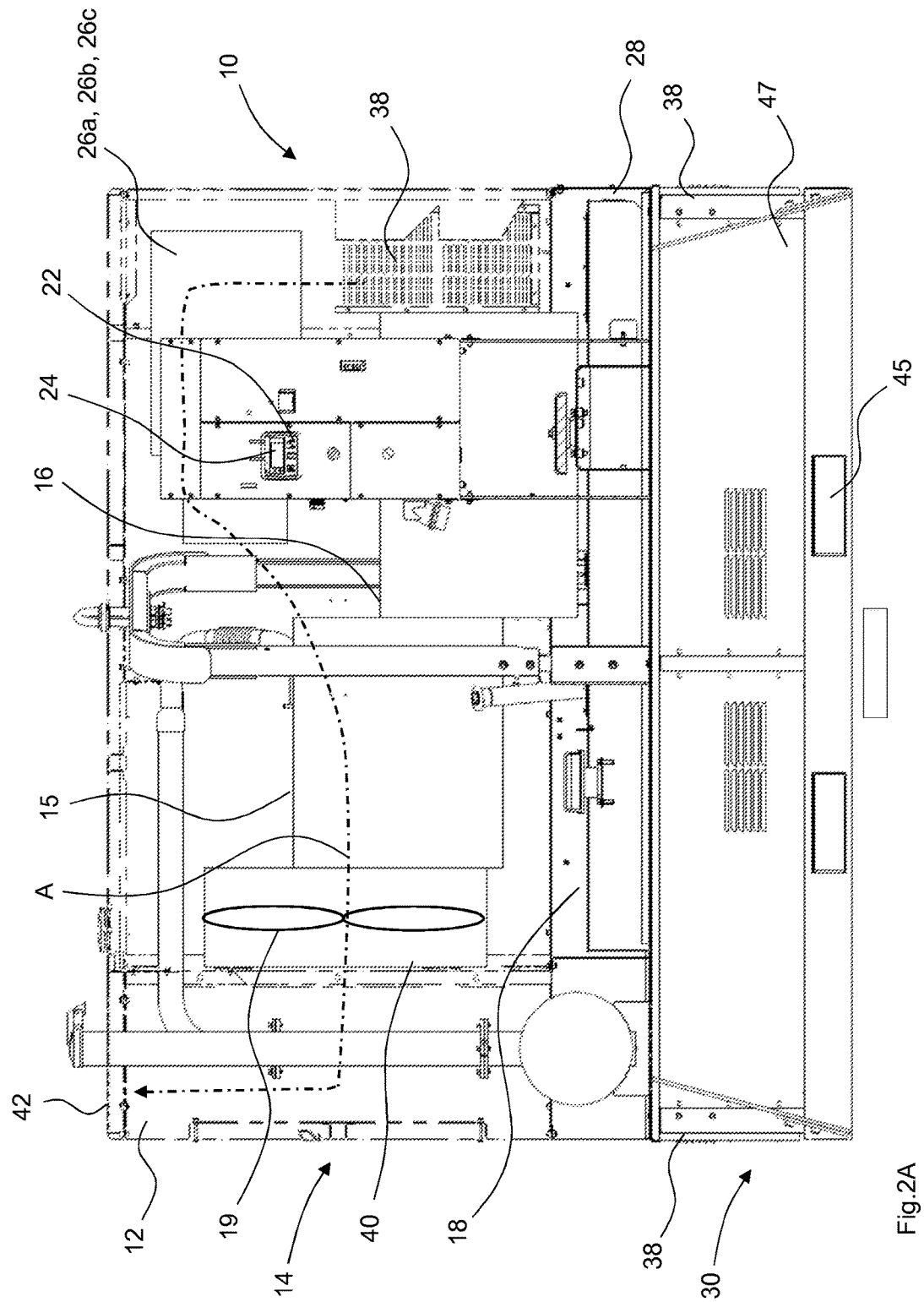
FIG. 2A is a cutaway side view schematically illustrating the location of components within the generator set.

In this embodiment, louvers 38 are provided in a lower portion of side walls of the canopy 12 at the right hand side as viewed in FIGS. 2 and 2A for air to be drawn in. A baffle (not visible) directs the intake air upwards past the chargers 26a, 26b, 26c so as to cool them. The air is the drawn from right to left past the generator 16 and engine 15 through the fan 19 and a heat exchanger 40 for the engine, before being exhausted through a grille 42 seen most clearly in FIG. 1. Dotted arrow A illustrates this air flow path. This arrangement advantageously enables the chargers 26a, 26b, 26c to be cooled by the incoming air before it becomes significantly heated by the engine 15 downstream. The equivalent space occupied by the chargers 26a-26c has hitherto been vacant in known gensets.

The lower portion 30 is also fabricated from sheet metal, with the internal racks 36 also being sheet metal. In this embodiment the end walls comprise louvers 38 and further louvers 38 are provided on each of the side walls. At each end, between the racks 36 and the end walls, four electric fans 44 are provided to draw air in and through the end louvers and out through the side wall louvers. As can be seen in FIG. 3, vertical sections of the racks 36 are perforated to assist in the circulation of air. This arrangement provides for good airflow (illustrated by arrows B) to cool the batteries 34 without this being affected by heat generated in the upper portion 14. The use of multiple fans 44 allows for redundancy in case of a fan failure.

As can be seen in FIG. 3, an opening 46 is provided in the top of the lower portion 30 for cabling from the battery pack 32 to pass through and into the upper portion 14.

The lower portion 30 further includes through apertures 45 such that the genset 10 may be lifted using pallet forks. Panels 47 on the side walls are removable (e.g. by removing screws) to access the batteries 34 for inspection and maintenance.

In this embodiment, the upper and lower portions 14, 30 are provided as separate self-contained sections, attachable using releasable fasteners such as bolts. The upper and lower portions 14, 30 are secured together via a perforated connecting plate 62, which is secured proximate the bottom corners of the side faces of the upper and lower portions. The upper and lower portions 14, 30 include angled perforated mounting plates 64, 66 which protrude from the side faces of the upper and lower portions at an angle of around 20 degrees to the vertical. The connecting plate 62 is secured to the mounting plate 64 of the lower portion 30 via bolts 68 secured through the perforations, resulting in the connecting plate 62 extending over the top edge of the lower portion 30.

Upon lowering of the upper portion 14 onto the lower portion 30, as in during assembly of the portions, the angled mounting plates 66 assists in aligning the upper portion with the lower portion as the bolts are tightened, thus allowing for an easier assembly.

This enables the lower portion 30 to be exchanged, for example to swap a fully charged battery pack 32 for a discharged pack, or to switch a genset 10 between having a battery storage option and no battery storage (i.e. between a hybrid or non-hybrid power system).

In other embodiments, the upper and lower portions 14, 30 may be formed as a single, non-separable unit. In these embodiments, the battery pack may nevertheless be removed as a whole or via two or more subassemblies/supports to ease the exchange thereof. In further embodiments, the genset may be provided with wheels and a tow bar so as to be transported as a trailer.

Figure 5:
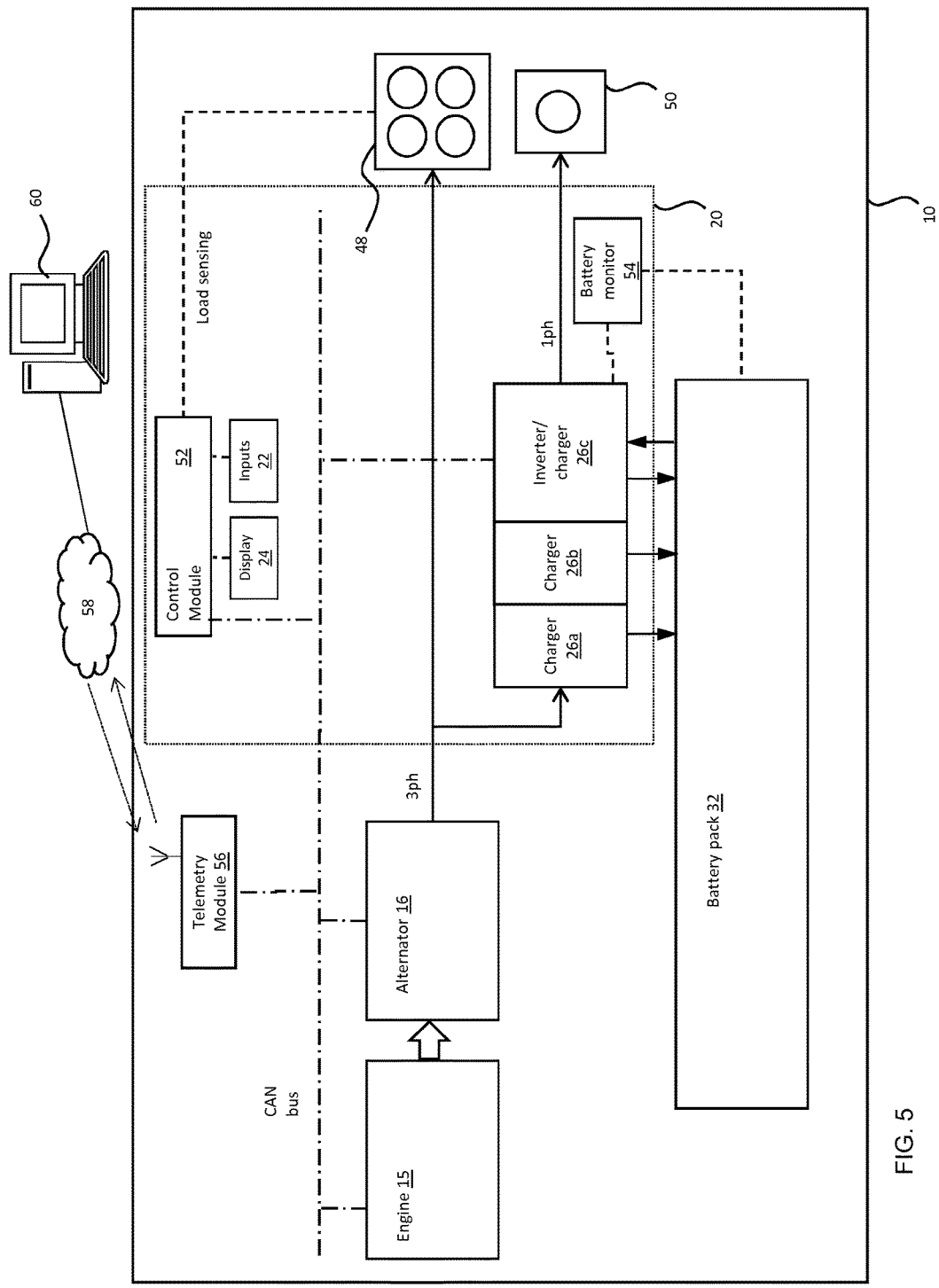
FIG. 5 is a schematic diagram of the major components of the generator set of FIGS. 1 and 2.

With reference to FIG. 5 the functional layout of the genset 10 is illustrated in more detail. In this Figure, solid lines indicate a power supply connection, dotted lines a signal line, and dot-dash lines a Controller Area Network (CAN) bus connection.

In this embodiment, the prime mover is a four cylinder Dieselmax diesel internal combustion engine 15 manufactured by the present applicant, with a power output of 50 kW (to provide 60 kVA of power). However similar engines may be rated to output 100 kW (to provide approx. 120 kVA of power). This is mechanically coupled to a three phase generator, suitable for providing three phase electrical power to industrial plant equipment via four three phase outlet sockets/terminals.

In addition, the alternator 16 is connected to the three chargers 26a, 26b, 26c. Each charger is configured to convert one phase of AC into DC to charge the battery pack 32, when required. This arrangement ensures the battery pack may be charged at the maximum rate possible, when required.

In this embodiment, the battery pack 32 is capable of being charged at a rate of 25 kW (i.e. approx. half the output of the engine 15) and at this charging rate it will take approximately two and a half hours to reach an 80% battery charge. Above an 80% battery charge, it becomes less efficient to charge the battery pack, such that above this battery level it would not be as efficient to run the engine simply for the purpose of charging the batteries.

Further, the battery pack 32 has a total storage capacity of 40 kWh. However to maintain lead acid batteries of this type in good condition for a long service life, it is preferred to avoid the battery pack dropping below a 50% charge, although this parameter differs for different battery types.

The maximum output power for a continuous load of the battery pack 32 is 10 kVA, although a peak output of 20 kVA is possible for 5 seconds. Thus, it will be appreciated that the power output for the battery pack 32 is significantly lower (approx. $\frac{1}{6}^{th}$) the power output of the engine 15 and alternator 16.

In this embodiment, one of the chargers 26c is a combination inverter/charger. Thus, charger 26c is able to convert the DC power from the battery to single phase AC to be supplied to a further outlet socket 50, hereinafter referred to as a hybrid socket.

In this embodiment the two chargers 26a and 26b are Skylla 1 model chargers from Victron Energy of Almere Haven, The Netherlands. The inverter charger is a Victron Quattro model. In addition, the three chargers comprise an inbuilt control capability which works in conjunction with a main control module 52 to ensure the genset runs as intended. Specifically, the chargers 26a to 26c operate in conjunction with a battery monitor 54 to be aware of various battery parameters including percentage charge and battery temperature. In addition, the chargers may be set such that when the three phase outlet 48 is consuming a maximum amount of the power generated by the alternator 16, no power is taken and converted to DC for the charging of the battery pack. Further, the inverter charger 26c is capable of signalling that the engine 15 needs to be started to supply this demand.

The main control module 52 is in this embodiment, a microprocessor controller of a type known for use in the control of prior art generators, but with additional functionality added thereto. In this embodiment the control module is a DSE7410 model manufactured by Deep Sea Electronics plc of Filey, North Yorkshire, UK.

The main control module 52 is capable of communicating with the engine 15, alternator 16 and chargers 26a to 26c via a CAN bus, alternatively this communication may be via direct analogue connectors. As such, it is capable of receiving operating parameters of the aforesaid components, such as engine speed, engine load, loading on each phase, battery data and fuel level, and is also capable of signalling engine start and controlling the fuel supply to the engine 15. In addition, the control module 52 is further capable of sensing a load applied to the three phase outlets and on receipt of this signal, instructs engine start.

In addition, in this embodiment, the genset 10 comprises a telemetry module 56. The telemetry module 56 comprises a transmitter capable of communicating via a cellular radio network using a suitable protocol, such as GPRS, UMTS or LTE, and the internet 58 with a central server 60 at a remote location, such that operating parameters of the machine may be presented to authorised users and, for example, reports generated of machine usage, machine location etc. To enable this, the telemetry module 56 is capable of collecting data from the engine 15, alternator 16, control module 52 and the chargers 26a to 26c.

Figure 6:
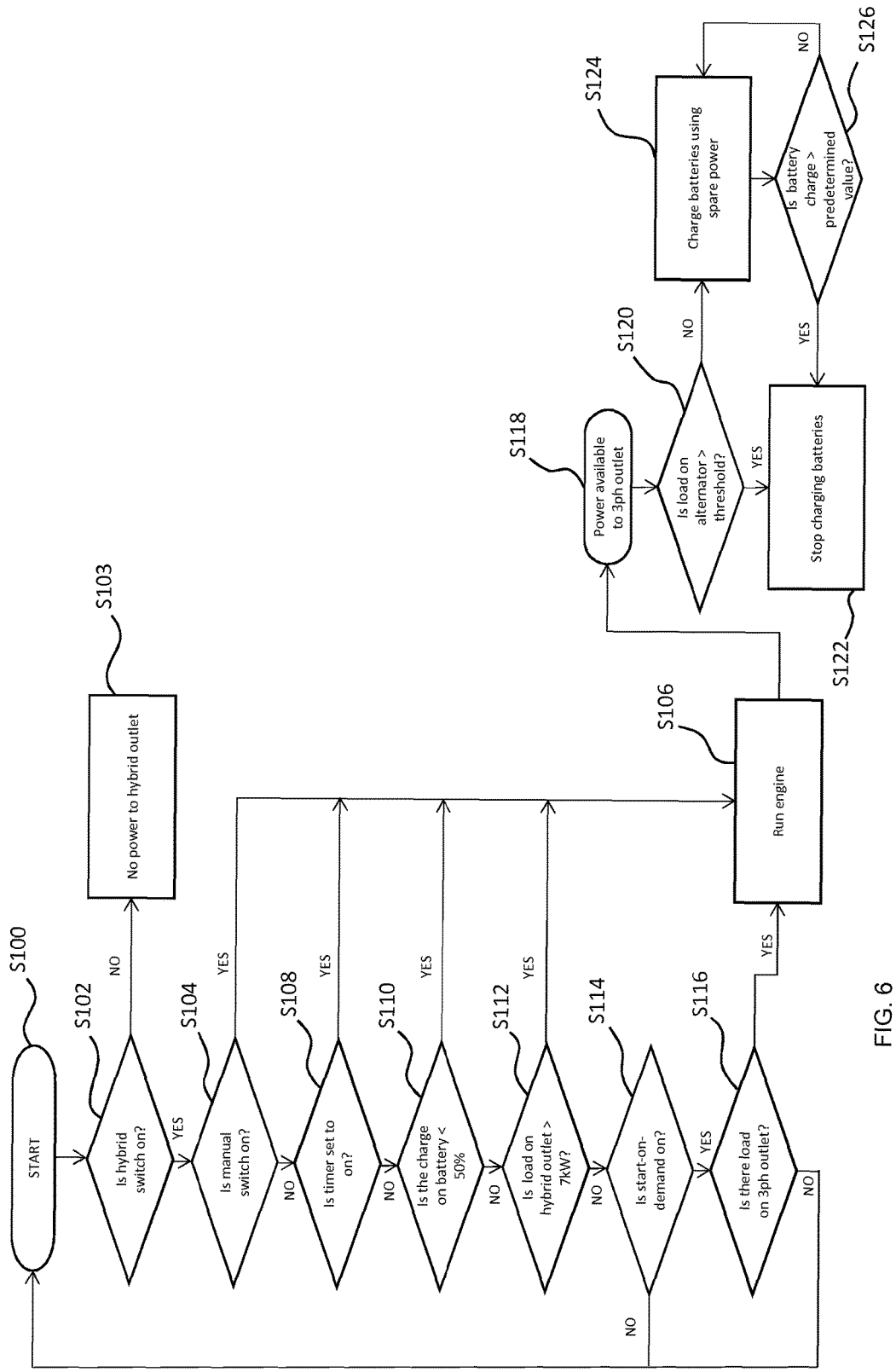
FIG. 6 is a flowchart illustrating the operation of the generator set of FIGS. 1 and 2.

With reference in particular to FIG. 6, operation of the genset 10 is as follows:

Upon delivery to a particular operating site, for example a construction site, an operator initially determines which electrical devices are to be attached to which outlet sockets. For example, site office devices would typically be connected to the hybrid outlet socket 50 since heating, cooling, security cameras, computers and lighting are usually relatively low demand devices which are on for extended periods of time. In addition, certain of these functions, such as security cameras and computers require a supply that is instantly available and not interruptible.

Other devices on a site, such as cranes, concrete mixers and large power tools would typically be used intermittently but require a significantly larger supply of power. Accordingly, such devices are plugged into the three phase outlet sockets 48.

Thus, starting the process at step S100, assuming the genset 10 is fuelled with diesel, has some battery charge and is turned on, the user can select various operating modes using inputs 22.

If at step S102 a switch to select whether power from the hybrid socket is available is turned to off, then no power is supplied to the hybrid outlet at step S103 and only power may be provided via the three phase outlets 48.

Then if at step S104 the user selects the manual running mode by selecting a manual switch to on, the engine 15 starts and runs permanently at step S106. If the manual switch is not on, the operator may instead have selected a timer mode at step S108 to, for example, run the engine for the working hours of a construction site in order to provide permanent three phase power to the outlets 48. If the timer is operational and set to on, then the engine is set to run at step 106.

If at step S110 the timer is not on, but the charge on the battery pack 32 is detected by the battery monitor 54 as being less than a predetermined desirable value (in this embodiment less than 50%) then the control module 52 signals the engine to run at step 106.

If at step S112 the battery charge is at greater than 50%, but the inverter charger 26c determines that the load on the hybrid socket 50 is greater than a predetermined threshold, in this embodiment, greater than 7 kW then the inverter charger 26c signals the control module 52 accordingly and the control module signals the engine to run at step 106.

An operator may also select whether the "start on demand" function is available, and at step S114 the control system confirms if this is enabled. If start on demand is on and the control module 52 determines there is a load on the three phase outlet 48, at step S116 the control module 52 in turn signals the running of the engine at step 106.

At step S118, once the engine is running, power becomes available at the three phase outlets 48. Typically the time from detecting a demand to being able to supply power to meet that demand is five seconds or less.

At step S120 the control module 52 determines if the load on the alternator 16 is greater than a predetermined threshold. In certain embodiments, this may cause charging to cease. However, in preferred embodiments, this may cause charging to reduce in stages. Thus, once an average load of 80% of maximum is reached, for example, the phase with the highest load ceases to charge. Then, if the average load reaches 85% another charger ceases to charge, and finally if the average load reaches 90%, the final, most heavily loaded charger ceases to charge. As well as ensuring that the alternator 16 and engine 15 are not too heavily loaded, this approach assists in balancing the phases. It will also be appreciated that due to hysteresis, transient spikes in load on a phase may not cause charging to cease on that phase.

Nevertheless, if the upper limit is reached, then at step S122 the control module 52 signals the chargers 26a to 26c to stop charging the battery pack in order to provide available capacity to the three phase outlets 48.

If however, capacity is available; at step S124 the control module 52 signals the chargers to charge the batteries. If, at step S126, the battery charge is above a predetermined value the control module 52 signals the chargers to stop charging the batteries. If the engine is running, at step S110 due to the battery charge being less than 50% then the predetermined value is 80%. If however, the engine is running at steps S112 or S116 due to a load on the genset then the predetermined value is 100%. This is because, despite charging being less efficient above 80%, if spare power is available it is sensible for it nevertheless to be used for charging.

In this embodiment this approach is preferred because lead acid batteries become less efficient to charge when above 80% battery charge. As such, this approach is used to increase the overall efficiency of the genset.

Whilst the flow chart of FIG. 6 shows a single cycle of operation, it will be appreciated that the steps may operate as a continuous loop. By way of example, after a delay of, for example, one minute step S116 is repeated and if no load, is detected, then the control module 52 signal the engine to stop. It will further be appreciated that the predetermined parameters may be overridden automatically, or by operator override in some circumstances. For example, if the engine is unable to run due to lack of fuel or malfunction, the control module may be programmed to continue the supply of power to the hybrid outlet until the battery is exhausted or a lower absolute minimum charge level is reached. In this instance, the control module 52 emits an alarm on the machine or remotely via the telemetry module 56 which sends an alert to a remote operator via the internet 58 and server 60.

Figure 7:
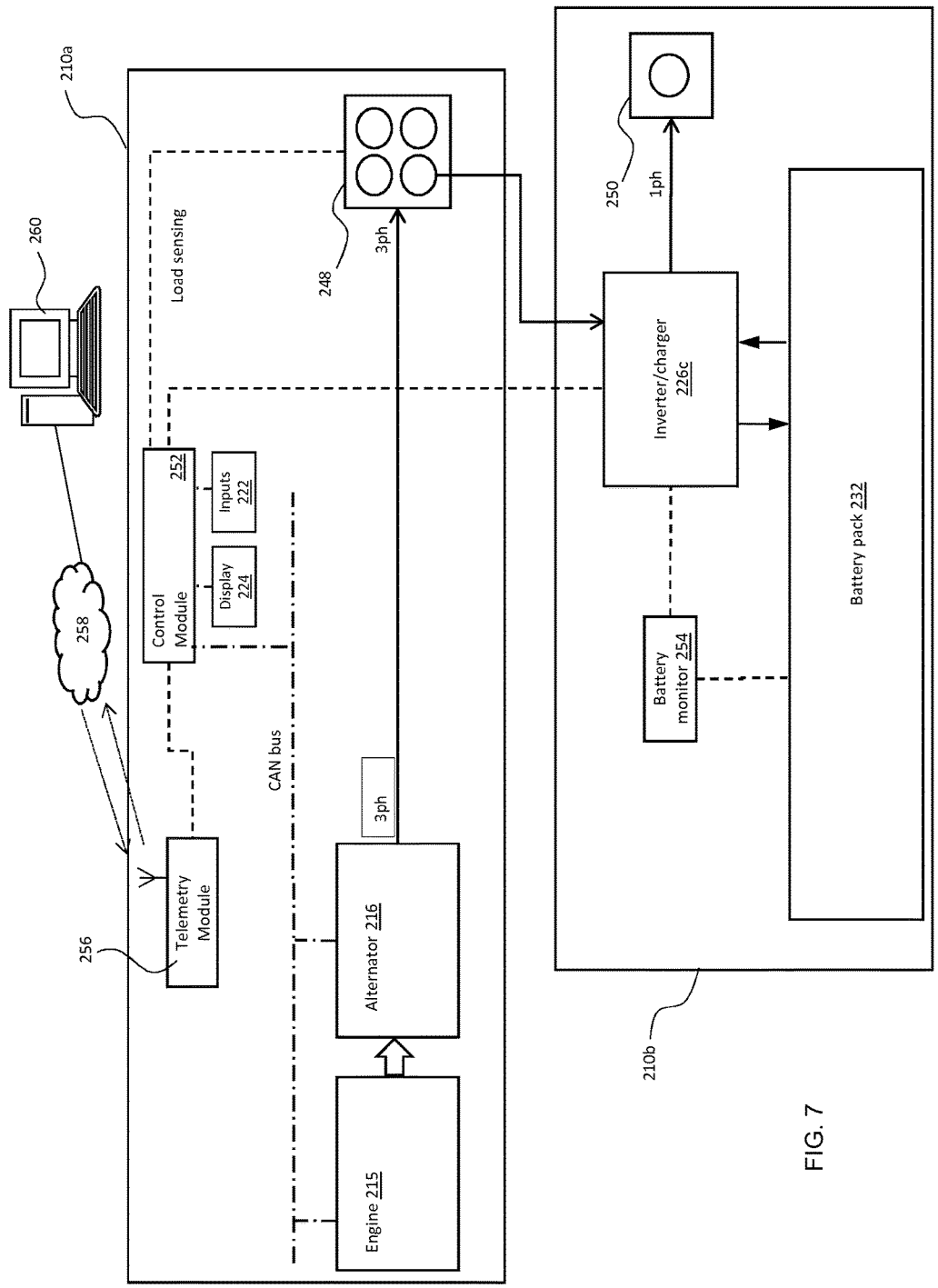
FIG. 7 is a schematic diagram of another embodiment of a generator set for use with the invention.

Referring to FIG. 7, a second embodiment of a genset for use with the invention is shown. Like parts are labelled by like numerals as the first embodiment, but with the addition of the prefix "2". Only differences with the first embodiment are discussed in more detail.

The second embodiment of FIG. 7 differs principally in that the genset 210 comprises two separate parts; a main part 210a housing the engine 215, alternator 216, control module 252 and outlets 248 and a separate "battery box" 210b which houses the battery pack 232 and a charger/inverter 226c, as well as a cooling mechanism (fans not shown).

This arrangement permits an existing conventional generator (either from the present applicant or a third party) to be converted into a hybrid generator that may share many of the advantages of the first embodiment quickly and at reasonable expense. In this embodiment the battery box 210b has a plug to plug into an outlet socket 248 of the main part 210a and draw power therefrom.

The AC power is fed into a single phase charger/inverter 226, which in this embodiment is a Victron Quattro similar to the first embodiment, to convert AC to DC to charge the batteries, and in reverse to supply power to the hybrid outlet with single phase AC when required. The use of single phase power for charging slows the process somewhat, but enables the battery box 210b to be compatible with a broad range of generators. In other embodiments a three phase arrangement similar to the first embodiment may be used.

The charger/inverter 226 is connected to a battery monitor 254 so to have data on battery condition. In this embodiment, the only signal line between battery box is a two-wire remote start connection, again so as to maintain broad compatibility with a range of generators, some of which may not have a CAN bus (although a CAN connection could be provided in other embodiments).

Nevertheless, this arrangement permits the charger/inverter 226 to signal to the control module 252 to start the engine in order to maintain a desired battery charge level. Further, assuming the engine 215 and generator 216 have a greater output capacity than the battery pack 232, the generator is still capable of supplying power to the remaining three phase outlets which also charging the battery.

It would be understood that different genset arrangements to those described above may be utilised with the method in accordance with the invention. For example the genset may use capacitors or other means of energy storage rather than batteries. The size of engine and battery pack may be scaled up or down as required. A genset of the first embodiment may be used in conjunction with a battery box of the second embodiment to add to the amount of energy storage available.

Figure 8:
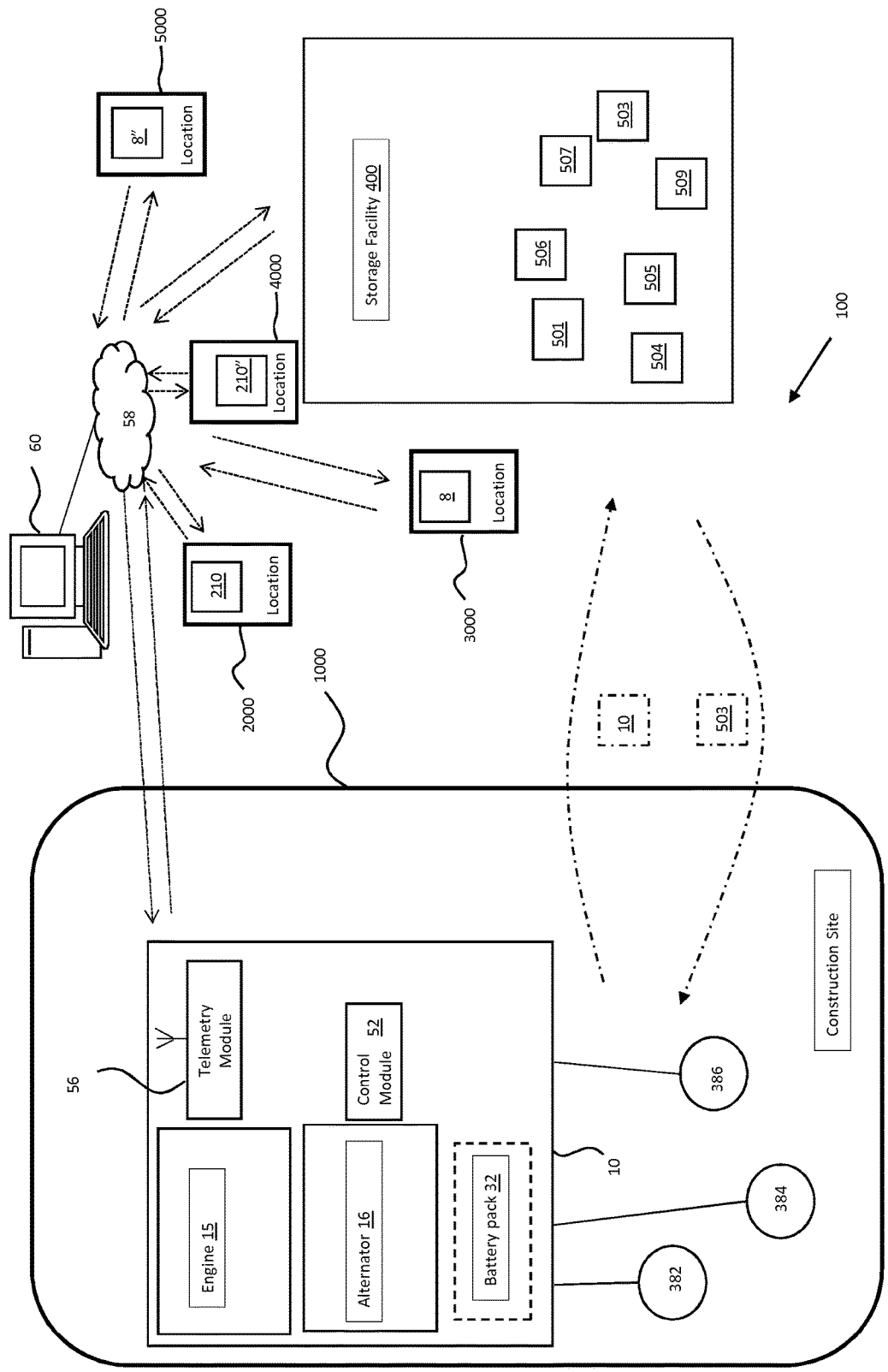
FIG. 8 is a schematic diagram of a power monitoring and wastage reduction system in accordance with the invention.

Referring to FIG. 8, a system 100 for facilitating the reduction of power wastage of a generator set at a location in accordance with the invention is shown. It would be understood that the features of the system 100 depicted in FIG. 8 are not drawn to scale.

In the embodiment shown, the location is in the form of a construction site 1000. The construction site 1000 is off-grid and does not have access to mains electricity. A power system in the form of a genset is provided on-site to provide power to one or more devices/equipment 382,384, 386, on the construction site 1000.

The one or more devices/equipment 382, 384, 386 may for example be cranes, concrete mixers, large power tools and/or site office devices such as heating, cooling, security cameras, computers and lighting etc.

In the embodiment shown, the genset is the genset 10 described above (certain features of the genset have been omitted from FIG. 8 for clarity).

As described above, the telemetry module 56 comprises a transmitter capable of communicating via a cellular radio network using a suitable protocol such as GPRS, UMTS or LTE and the internet 58 with a central server 60 at a remote location, such that operating parameters of the machine may be presented to authorised users and, for example, reports generated of machine usage, machine location etc. To enable this, the telemetry module 20 is capable of collecting data from the engine 22, alternator 24, control module 28 and the chargers.

In embodiments wherein the genset is not a hybrid genset (i.e. not comprising the battery pack 32 and chargers), the telemetry module 56 will be capable of collecting data from the engine 15 and alternator 16, and if present the control module 52.

The electrical energy supplied and the power provided by the genset 10 to the devices/equipment 382, 384, 386 powered by the genset 10 is monitored by the telemetry module 56 and electrical energy supply data relating to the electrical energy/power provision is collected by the telemetry module 20 over a predetermined period, and forwarded to the central server 50.

The monitored and collected electrical energy supply data is processed and analysed to determine whether a repeated cycle is observed in relation to the on-site power demand. If a repeat cycle is observed, the electrical energy supply data is used to obtain a power supply profile for the genset 10 on the construction site 1000.

The system 100 further comprises control unit 60 having a processor configured to process and analyse the collected electrical energy supply data, and produce the generated power supply profile.

The power supply profile may comprise a maximum power supply value, an average power supply value, a minimum power supply value, all three values or a combination thereof. In addition, power supply profile include the length periods for which the genset 10 is operating at a particular output level (within certain bounds) and whether that is an output on the three phase or hybrid outlet. For example, the profile may note that between the periods of midnight and 6 am that power is supplied at a constant supply of 1 kW. Further, the profile may include trends. For example, a steady increase in hybrid power supply may be observed as weather becomes colder towards winter and requirements for heating a site office may increase.

The system 100 further comprises a storage facility 400 wherein a plurality of different power systems 501, 503, 504, 505, 506, 507, 509 are stored. The power systems 501, 503, 504, 505, 506, 507, 509 may be battery packs, battery boxes, hybrid gensets, non-hybrid gensets or a combination thereof.

An inventory of the characteristics, properties and power supply specifications of the power systems stored in the storage facility 400 and the power system which is on-site is retained on a database within the central server 60.

Figure 9:
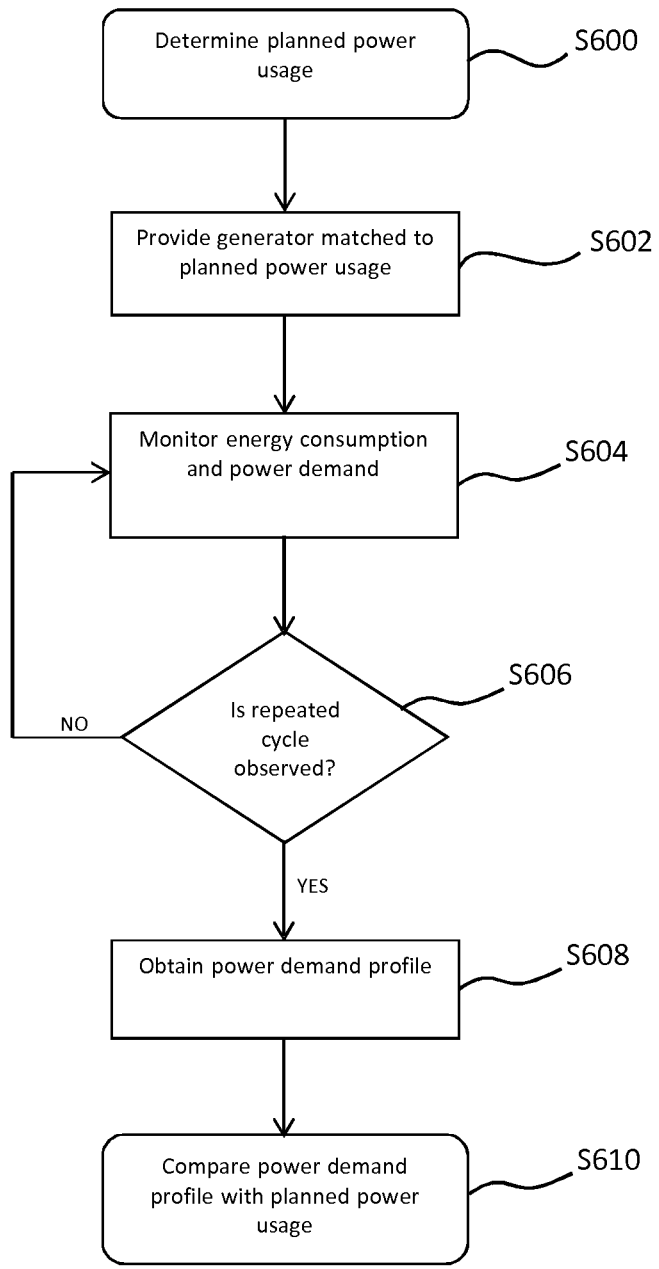
FIG. 9 is a flow chart illustrating a method of monitoring the power provision of a generator set at a location in accordance with the invention.
Figure 10:
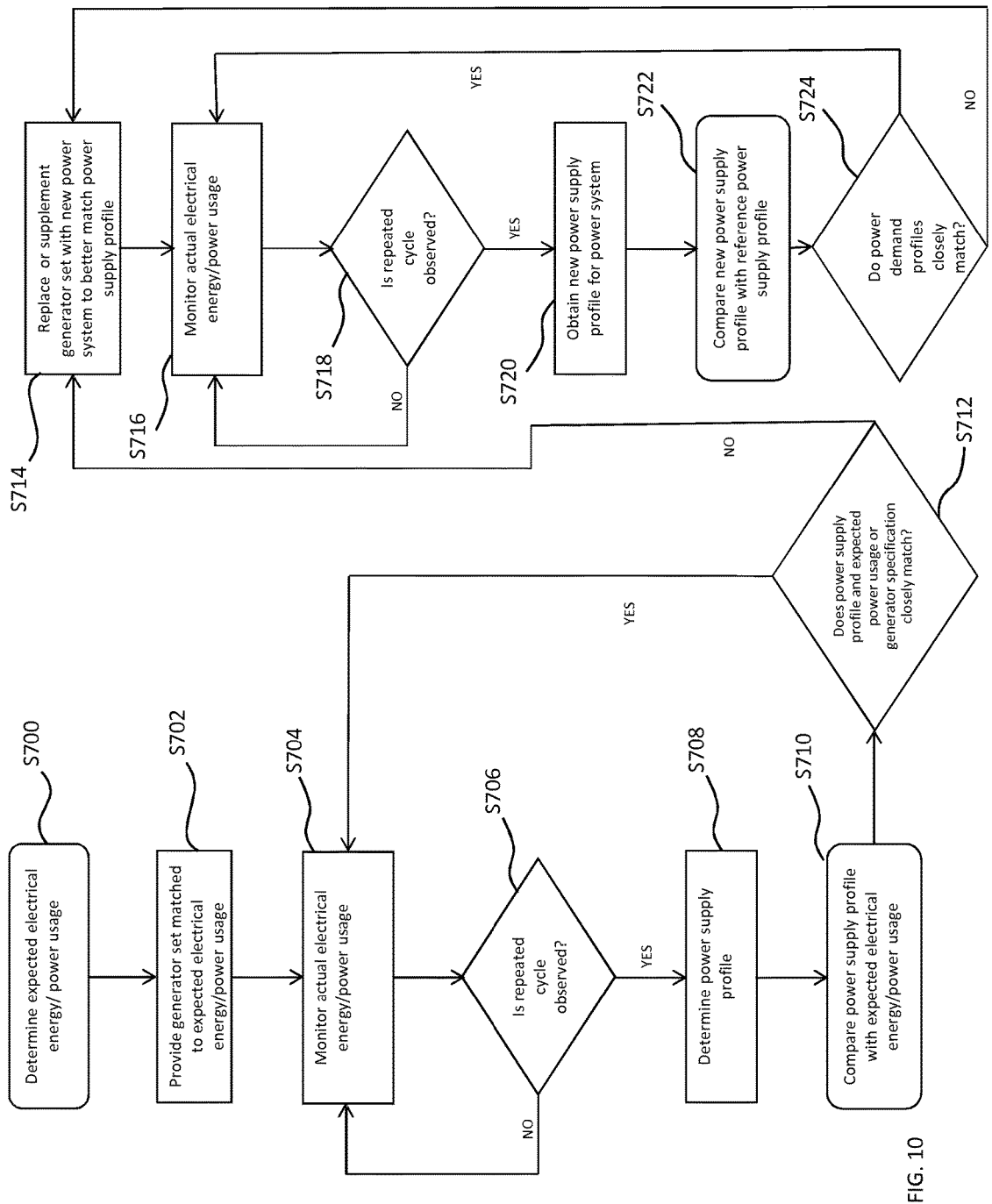
FIG. 10 is a flow chart illustrating of reducing power wastage of a generator set at a location in accordance with the invention.

Referring to FIG. 9, the steps of monitoring the power provision on the construction site 1000 will now be described.

Prior to commencement of the construction project, an analysis of devices/equipment that would need to be on-site will be determined. An expected electrical power usage on the construction site is then determined from the result of the analysis (step S600).

A genset 10 configured to provide electrical energy to and power one or more of the devices/equipment 382, 384, 386 on the construction site 1000 is selected and provided at the construction site 1000 in order to meet the determined expected power usage (step S602).

The energy consumption on the construction site 1000 and the electrical energy usage and power supply data from the genset 10 is monitored and communicated to the central server 58 by the telemetry module 56 (step S604).

The supply data is collected over a predetermined period of time and is analysed by the control unit 60 to identify whether a repeat cycle in the monitored power usage has occurred (step S606).

Once a repeated cycle is observed, a power supply profile for the genset 10 is generated (step S608). The parameter for number of repeated cycles that must be observed before a power supply profile provide is generated by the control unit 60 may be adjusted dependent on the construction project.

A power demand profile will capture the maximum power supply value, the average power supply value and the minimum power supply value as well as the durations at each level (i.e. supply value) over the cycle, the output supplying the electrical energy i.e. three phase or hybrid, and the time and date of each recorded value.

Once the power supply profile has been obtained, it is then compared with the expected power usage estimated at the start of the construction project (step S610) and or with the specification of the genset 10 at the site. A review of the actual power usage/supply or the specification of the genset 10 against the expected power usage/supply helps identify whether the genset 10 that is installed and currently on-site should be retained or changed for a different size or type of genset which better matches the actual on-site power usage/supply.

Referring to FIG. 9, a method of optimising genset resource at the location 1000 in accordance with the invention will now be described. Optimising genset resource at the location will facilitate the reduction of power wastage at the location 1000.

The initial steps for method are identical to the steps of the monitoring method described above, with steps S700 to S710 corresponding to steps S600 to S610 respectively.

Following the comparison of the expected power usage/supply against the actual on-site power usage/supply or with the specification of the genset 10, a determination of the whether the expected power usage/supply or genset specification and the actual on-site power usage/supply as indicated by the power demand profile closely match is made (step 712). Power wastage is likely taking place/occurring if there is not a close match as the lack of a match indicates that the operational efficiency of genset 10 is not optimal. In addition to reducing wasted power, the method may also identify other non-optimal genset deployments, such as a hybrid genset where the demand on the battery pack is such that it is constantly being charged by the engine, meaning that the battery may prematurely fail. The decision may be made by a controller notified by an alert or report, or may be automated based on inputted parameters into the control unit 60.

If the expected power usage/supply and the actual on-site power usage/supply closely match, steps S704 to S710 are repeated until a close match is not observed.

When a close match is not observed, an inventory check of the power systems 501, 503, 504, 505, 506, 507, 509 in the storage facility 400 is performed in order to identify a power system that either better matches the obtained power supply profile or may be provided on-site to supplement or replace a component of the on-site genset 10 in order to obtain better match the required on-site power supply.

For example, if the inventory check indicates that the power system 503 better matches the on-site power supply requirements, once identified, the on-site genset 10 is replace by the better matched power system 503 (shown in phantom in FIG. 8) as per step S714. The better match power system 503 may be a hybrid power system or a non-hybrid power system.

If for example, the inventory check indicates that the on-site genset 10 may be supplemented by an auxiliary battery pack in order to better match the on-site power supply requirements, or that the battery pack/box in the genset 10 should be replaced by a higher or lower capacity battery pack in order to better match the on-site power supply requirements, the auxiliary/replacement battery pack/box will be transported to the construction site 1 to supplement/replace the battery pack of the on-site genset 10.

In situations wherein the on-site genset is a non-hybrid power system, a battery box as previously described may be transported to the construction site 1000 to convert the on-site genset into a hybrid power system/genset.

The replacement or updating of the on-site genset should take place when a disruption in the power supply will cause minimal interruption to the construction project. This may be identified by an analysis of the time periods when the on-site power requirements is at a minimum. The analysis may also factor in the costs for replacing the genset into the decision as to whether a replacement is recommended such that the payback of the transportation and labour costs of doing so may be assessed.

Where trends in the profile are identified, a decision may be made pre-emptively to replace a genset in expectation of it no longer being the optimal genset for a particular location at a predetermined time in the future The last generated power demand profile (i.e. the one which indicated that a close match is not observed) is stored and used as a benchmark/reference for the next set of match comparisons (i.e. replaces the expected power usage data for comparison purposes).

Once on-site, the energy consumption and power demand on the newly installed genset 503 (or updated genset) is monitored in the same way as was done for the initially installed genset 10 (step S716).

Once again, the control unit 60 monitors the collected data to identify whether a repeated cycle has occurred (step S718).

When a repeated cycle is observed and the parameters set dictating the conditions for the production of a power supply profile is met, a new power supply profile for the newly installed genset 503 (or updated genset) is obtained (step S720).

The new power supply profile for the newly installed genset 503 (or updated genset) is compared with the reference power supply profile, i.e. the power supply profiled for the previous genset 10 (step S722).

If the reference power supply profile and the new power supply profile do not closely match, an inventory check of the power systems in the storage facility 400 is performed in order to identify a power system that either better matches the obtained power supply profile or may be provided on-site to supplement or replace a component of the on-site genset 503 in order to ensure that the power system on the construction site 1000 is a better matched power system to the power supply requirements on the construction site.

For example, the genset 503 may be replaced by the initially installed genset 10 if it is a better match, by any of the other gensets in the storage facility 400 providing a better match, supplemented by a battery box to obtain a better match etc.

The methods in accordance with the invention provide ongoing efficiency and cost saving information to a user and by means of optimisation of the genset used on a construction site based on the current power demand on the construction site.

For example, a construction site using a non-hybrid genset to power devices/equipment running for 1104 hrs at 3314 kwh (average 3 kw) uses fuel at approximately 6 liters per hour. This amounts to 6624 liters of fuel at a cost of approximately £4703. Following analysis of the power consumption/demand utilising the method of the invention it is identified that a hybrid genset is better suited based on the power demand profile, the engine runs at 50% load for 110 hrs together with the power supplied by the battery to provide the required 3314 kwh demand. This will result in the consumption of fuel at a rate of 8 liters per hour (by virtue of operating at a higher load than the conventional genset) which amounts to 880 liters of fuel at a cost of approximately £625. This provides an overall costs saving of around £4078 (approx. $6000). In addition, as the engine runs less frequently, two fewer services are required over the time period.

It would be understood that the system and methods in accordance with the invention may be utilised to monitor the power provision and/or reduce power wastage of multiple generator set 10, 210, 210", 8, 8" at a plurality of locations 1000, 2000, 4000, 3000, 5000 at the same time as indicated in FIG. 8. In such situations, the monitoring of the power provision of the gensets on the different sites will occur simultaneously and the genset 10, 210, 210", 8, 8" from different sites may be replaced with each other (i.e. not from the storage facility) if they are identified to be a better match to the power supply demand on the other site. The genset labelled 8 in FIG. 8 is a conventional genset and the genset 210 is a genset in accordance with the earlier described embodiment. A double prime suffix is used to indicate gensets wherein a battery pack or box is used to supplement the power supply characteristics of the genset at the location.

While the invention has been describe with reference to the monitoring of power provision at a location in the form of a construction site, it would be understood that it not limited thereto. The invention may be utilised in locations where main electricity is unavailable ("off-grid" locations) and one or more generator sets are required to power one or more devices/equipment over a prolonged period of time. Examples of such locations include mines, oil and gas installations, temporary camps and the like.

Furthermore, although described in relation to use with mobile gensets, the invention may also be applicable to permanent/static gensets. Other types of prime movers may be utilised such as gas turbines. Additionally the genset, in the case of a hybrid power system, may have inputs such that the battery can also be charged from renewable sources such as solar cells and wind turbines. Other suitable arrangements for releasably attaching the upper and lower portions may be used instead of the perforated plates and bolts. The term "battery" may also encompass other forms of electrical storage such as capacitors.

Although the invention has been described above with reference to one or more preferred embodiments, it will be appreciated that various changes or modifications may be made without departing from the scope of the invention as defined in the appended claims.

In addition, the invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of remotely monitoring the power provision of a generator set at a first location, the method comprising the steps of:
   determining an expected electrical energy usage by one or more devices at a first location;
   providing a generator set configured to provide electrical energy to power the one or more devices at the first location, the generator set arranged to provide an amount of electrical energy that at least meets the determined expected electrical energy usage, and the generator having a telemetry module arranged to monitor electrical energy supply data and transmit the electrical energy supply data to a processor at a second different location;
   the telemetry module monitoring the electrical energy supply data of the generator set over a predetermined period and transmitting the electrical energy supply data to the processor;
   the processor analyzing the electrical energy supply data to determine whether a repeated power demand cycle is observed, such that when a repeated power demand cycle is observed, the electrical supply data is used to obtain a power supply profile for the generator set at the first location; and
   comparing the power supply profile for the generator set with the expected power usage and/or the power supply specifications of the generator set.

2. A method according to claim 1, wherein the power supply profile comprises a maximum power supply value for the generator set at the first location.

3. A method according to claim 1, wherein the power supply profile comprises an average power supply value for the generator set at the first location.

4. A method according to claim 1, wherein the power supply profile comprises a minimum power supply value for the generator set at the first location.

5. A method according to claim 1, wherein the power supply profile comprises a trend for the generator set at the first location.

6. A method of reducing power wastage of a generator set at a first location, the method comprising the steps of:
   monitoring the power provision of the generator set at the first location by providing a generator set configured to provide electrical energy to power one or more devices at the first location, the generator set arranged to provide an amount of electrical energy that at least meets a determined expected electrical energy usage, and the generator having a telemetry module arranged to monitor electrical energy supply data and transmit the electrical energy supply data to a processor at a second different location;
   the telemetry module monitoring the electrical energy supply data of the generator set over a predetermined period and transmitting the electrical energy supply data to the processor;
   the processor analyzing the electrical energy supply data to determine whether a repeated power demand cycle is observed, such that when a repeated power demand cycle is observed, the electrical supply data is used to obtain a power supply profile for the generator set at the first location;
   comparing the power supply profile for the generator set with the expected power usage and/or the power supply specifications of the generator set;
   the processor comparing the power supply profile against at least one of the power supply specifications of available generator sets in a database thereof and the power storage specifications of available batteries in a database thereof;
   determining if at least one of a second generator set having a power supply specification more closely matching the power supply profile and a battery having a power storage specification which together with the first generator set more closely matches the power supply profile is available;
   and undertaking at least one of replacing the generator set with the second generator set and supplying the battery to the generator set if such a matching generator set or battery is available.

7. A method according to claim 6, wherein the second generator set comprises an engine-generator.

8. A method according to claim 6, wherein the second generator set comprises a hybrid power system comprising an engine-generator, a battery pack and a power management center.

9. A method according to claim 6, wherein the second generator set comprises a renewable energy power source.

10. A method according to claim 6, further comprising the steps of:
    monitoring the power provision of the second generator set to the one or more devices at the first location;

determining a power supply profile for the second generator set;

the computer comparing the power supply profile of the second generator set against the power supply specifications of available generator sets in a database thereof;

if a third generator set having a power supply specification more closely matching the power supply profile of the second generator set is available, replacing the second generator set with the third generator set.

11. A method of reducing power wastage of a generator set at a first location, the method comprising the steps of:

monitoring the power provision of the generator set at the first location using a method in which the generator set is arranged to provide an amount of electrical energy that at least meets a determined expected electrical energy usage, and the generator having a telemetry module arranged to monitor electrical energy supply data and transmit the electrical energy supply data to a processor at a second different location;

the telemetry module monitoring the electrical energy supply data of the generator set over a predetermined period and transmitting the electrical energy supply data to the processor;

the processor analyzing the electrical energy supply data to determine whether a repeated power demand cycle is observed, such that when a repeated power demand cycle is observed, the electrical energy supply data is used to obtain a power supply profile for the generator set at the first location;

comparing the power supply profile for the generator set with the expected power usage and/or the power supply specifications of the generator set to determine a power supply profile;

the processor comparing the power supply profile against the power supply specifications of the generator set and identifying the difference between the two;

the processor comparing the difference against available battery packs or battery boxes in a database thereof;

if a battery pack or battery box having a power supply specification more closely matching the difference is available, undertaking a selected one of supplementing the generator set with the matching battery pack or battery box and replacing an existing battery pack or battery box with the matching battery pack or battery box.

12. A system for monitoring power consumption provisions of a generator set at a first location, the system comprising:

a plurality of generator sets, each generator set having a telemetry module arranged to monitor electrical energy supply data at the first location and transmit the electrical energy supply data of the generator set;

a database comprising the power supply specifications of each of the plurality of generator sets; and a processor configured to receive the electrical energy supply data transmitted by the telemetry module, wherein the processor is at a second location different from the first location, wherein the processor is configured to determine whether a repeated power demand cycle is observed, such that when a repeated power demand cycle is observed, the electrical supply data is used to create a power supply profile for a generator set in use and compare the power supply profile with the power supply specifications contained in the database.

13. A system as claimed in claim 12, wherein the system further comprises one or more battery packs or boxes, each battery pack or box configured to be coupled to a generator set.

\* \* \* \* \*